US011966182B2

(12) United States Patent
Takahashi et al.

(10) Patent No.: US 11,966,182 B2
(45) Date of Patent: Apr. 23, 2024

(54) FIXING DEVICE AND IMAGE FORMING APPARATUS

(71) Applicant: KYOCERA Document Solutions Inc., Osaka (JP)

(72) Inventors: Hironori Takahashi, Osaka (JP); Masakazu Uehara, Osaka (JP); Tomohiro Watatani, Osaka (JP); Shota Onishi, Osaka (JP); Yuhiro Sakai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/159,588

(22) Filed: Jan. 25, 2023

(65) Prior Publication Data

US 2023/0244168 A1 Aug. 3, 2023

(30) Foreign Application Priority Data

Jan. 28, 2022 (JP) ................................ 2022-012133

(51) Int. Cl.
*G03G 15/20* (2006.01)

(52) U.S. Cl.
CPC ................................ *G03G 15/2064* (2013.01)

(58) Field of Classification Search
CPC ........................................... G03G 2215/00143
See application file for complete search history.

(56) References Cited

U.S. PATENT DOCUMENTS

2012/0275833 A1* 11/2012 Ishida ................ G03G 15/2053 399/329
2012/0308279 A1* 12/2012 Tanaka ............... G03G 15/2053 399/329
2013/0251390 A1* 9/2013 Ishii ..................... G03G 15/205 399/69
2016/0320729 A1* 11/2016 Park ................... G03G 15/2053
2018/0203390 A1 7/2018 Honke et al.
2019/0391513 A1* 12/2019 Toratani ............. G03G 15/2053

FOREIGN PATENT DOCUMENTS

JP 6493891 B2 4/2019

* cited by examiner

*Primary Examiner* — Sevan A Aydin
(74) *Attorney, Agent, or Firm* — Alleman Hall & Tuttle LLP

(57) ABSTRACT

A fixing device includes a fixing member, a pressure member, and a pair of retention members each including a restriction surface. The restriction surface restricts a movement of the fixing member in an axial direction. The restriction surface includes a first contact area and a second contact area. The first area is an area more on a downstream side of a passing direction of a medium than a center of a pressure area in the passing direction, and also closer to the pressure area than an apex of the fixing member on an opposite side of the pressure area. The first contact area and the second contact area are each tilted at a certain gradient so as to be set apart from the end portion of the fixing member in the axial direction from a side of the apex toward a side of the pressure area.

8 Claims, 9 Drawing Sheets

FIXING DEVICE AND IMAGE FORMING APPARATUS

INCORPORATION BY REFERENCE

This application is based upon and claims the benefit of priority from the corresponding Japanese Patent Application No. 2022-012133 filed on Jan. 28, 2022, the entire contents of which are incorporated herein by reference.

BACKGROUND

The present disclosure relates to a fixing device which fixes a toner image on a medium, and an image forming apparatus.

A fixing device including a film and a pressure roller which comes into contact with the film and forms a nip portion is known. At both end portions of the film in a longitudinal direction, a pair of restriction members each including a restriction surface and a guide surface are attached. The restriction surface restricts a movement of the film in the longitudinal direction. The guide surface guides an inner circumferential surface of the film.

For example, when there is a difference in rotation speed between the both end portions of the film in the longitudinal direction, the film tilts such that a portion of the film on a side with a higher rotation speed is deviated toward a downstream side of a conveying direction of a recording member. In this case, there is a fear that the inner circumferential surface of the film will be set apart from the guide surface of one of the pair of restriction members. When the end portion of the film in the longitudinal direction comes into contact with the restriction surface in a state where the inner circumferential surface of the film is set apart from the guide surface, a situation where the end portion of the film is damaged due to bending or the like has occurred.

For example, in a conventional apparatus, lower portions of the restriction surface on the upstream side and downstream side of the conveying direction include a tilted surface that is tilted in a direction of being set apart from the end portion of the film in the longitudinal direction. Thus, it becomes difficult for the end portion of the film in the longitudinal direction to come into contact with the restriction surface.

However, in the conventional apparatus described above, a boundary portion between the lower portion of the restriction surface on the upstream side of the conveying direction and other portions that are not tilted forms a bent angular portion. In this case, there has been a fear that the end portion of the film will be damaged when being brought into contact with the angular portion.

SUMMARY

A fixing device according to an aspect of the present disclosure includes a fixing member, a pressure member, and a pair of retention members. The fixing member has flexibility, is formed in a cylindrical shape extending in an axial direction, and heats a toner image on a medium while rotating. The pressure member forms a pressure area between the pressure member and the fixing member while rotating, and pressurizes toner on the medium that passes through the pressure area. The pair of retention members each include a shaft-supporting portion and a restriction surface. The shaft-supporting portion rotatably guides one of both end portions of the fixing member in the axial direction. The restriction surface opposes the end portion of the fixing member in the axial direction and restricts a movement of the fixing member in the axial direction. The restriction surface includes a first contact area and a second contact area. The first contact area is an area more on a downstream side of a passing direction of the medium than a center of the pressure area in the passing direction, and also closer to the pressure area than an apex of the fixing member positioned on an opposite side of the pressure area in a radial direction of the fixing member. The second contact area is an area of the restriction surface excluding the first contact area. The first contact area and the second contact area are each tilted at a certain gradient so as to be set apart from the end portion of the fixing member in the axial direction from a side of the apex toward a side of the pressure area.

For example, the first contact area is tilted at a certain gradient so as to be set apart from the end portion of the fixing member in the axial direction from an upstream side of the passing direction toward the downstream side.

For example, a boundary portion between the first contact area and the second contact area is a curved surface.

For example, a surface of the shaft-supporting portion has a larger friction coefficient than the restriction surface.

For example, a surface roughness of the shaft-supporting portion is rougher than a surface roughness of the restriction surface.

An image forming apparatus according to another aspect of the present disclosure includes: an imaging device which forms a toner image on a medium; and the fixing device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
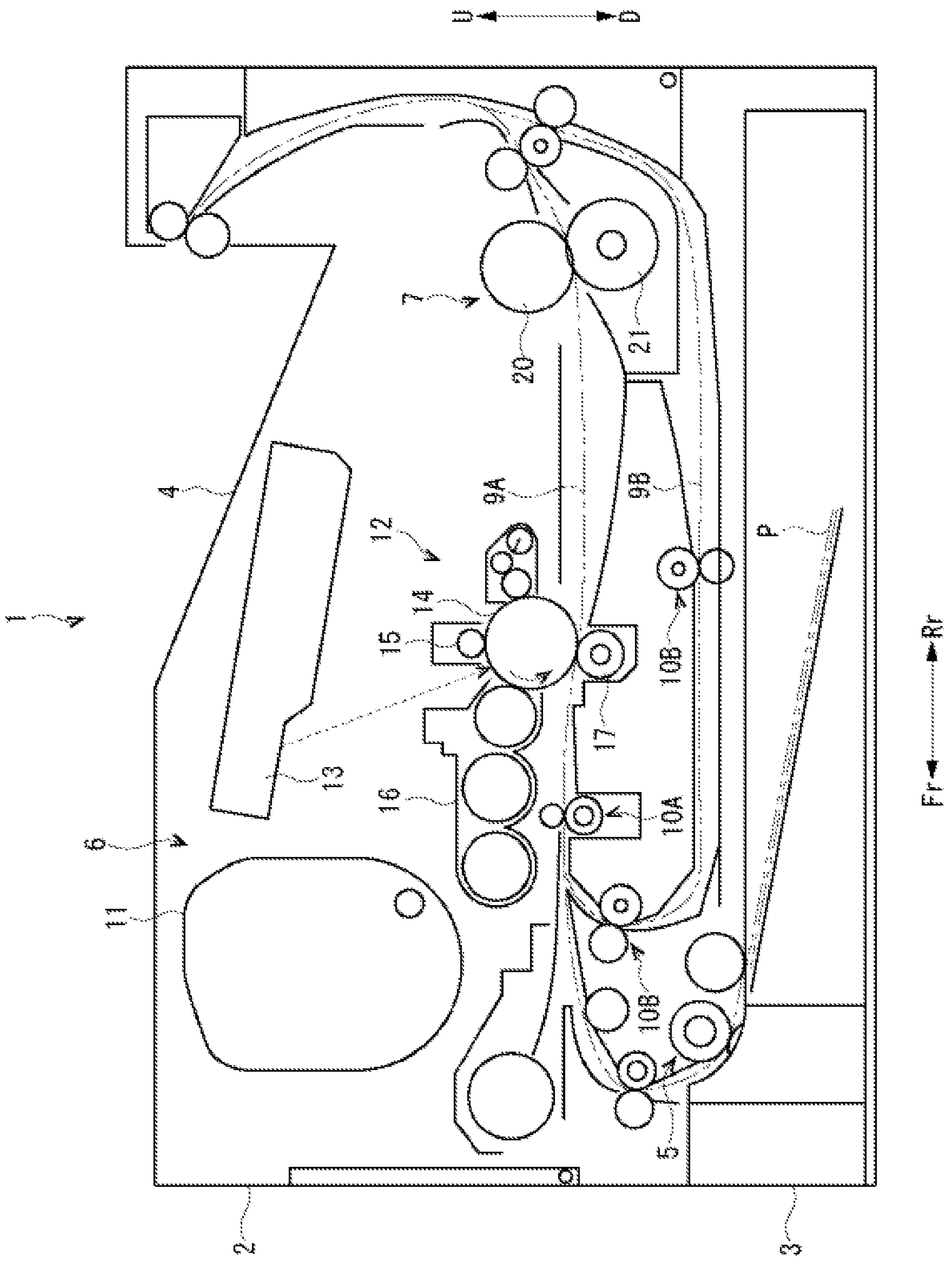
FIG. 1 is a schematic diagram (side view) showing an internal structure of an image forming apparatus according to an embodiment of the present disclosure.

Hereinafter, an embodiment of the present disclosure will be described with reference to the attached drawings. It is noted that Fr, Rr, L, R, U, and D in the drawings respectively indicate front, rear, left, right, up, and down of an image forming apparatus 1 and a fixing device 7.

In the image forming apparatus 1 and the fixing device 7, a front-rear direction, a left-right direction, and an up-down direction are orthogonal to one another. Although terms indicating directions and positions are used in the present specification, those terms are merely used for convenience of descriptions and do not limit the technical scope of the present disclosure.

In addition, "upstream", "downstream", and terms similar to these indicate "upstream", "downstream", and a concept similar to these regarding a passing direction of a sheet P in the fixing device 7. The passing direction is a conveying direction of the sheet P by the fixing device 7.

In the present embodiment, the passing direction is a direction along the front-rear direction. It is noted that in the respective figures, sizes, angles, and the like of members are not accurate and are schematically illustrated for descriptions.

With reference to FIG. 1, the image forming apparatus 1 according to the embodiment will be described. FIG. 1 is a schematic diagram (side view) showing the image forming apparatus 1.

The image forming apparatus 1 is a printer that uses electrophotography. The image forming apparatus 1 includes an apparatus body 2 constituting a substantially rectangular parallelepiped appearance.

At a lower portion of the apparatus body 2, for example, a sheet feed cassette 3 that houses a sheet P (medium) is provided detachably. A sheet discharge tray 4 is provided on an upper surface of the apparatus body 2. It is noted that the sheet P as an example of the medium is not limited to a paper sheet and may be a resin sheet and the like.

The image forming apparatus 1 includes a sheet feed device 5, an imaging device 6, and the fixing device 7. The sheet feed device 5 is provided at an upstream end portion of a conveying path 9A extending from the sheet feed cassette 3 to the sheet discharge tray 4, and feeds the sheets P housed in the sheet feed cassette 3 one by one to the conveying path 9A.

The imaging device 6 is provided at an intermediate portion of the conveying path 9A and forms a toner image on a conveyed sheet P. The fixing device 7 is provided on a downstream side of the conveying path 9A and thermally fixes the toner image onto the sheet P.

A registration roller pair 10A which temporarily blocks the conveyed sheet P and corrects a tilt of the sheet P is provided on the conveying path 9A. The correction of the tilt of the sheet P is called skew correction.

An inversion conveying path 9B is provided below the conveying path 9A. The inversion conveying path 9B branches from the conveying path 9A at a portion on the downstream side of the fixing device 7, and joins the conveying path 9A at a portion on the upstream side of the imaging device 6. A plurality of conveying roller pairs 10B for conveying the sheet P are provided on the inversion conveying path 9B.

The imaging device 6 includes a toner container 11, a drum unit 12, and a laser scanning unit 13. The toner container 11 is disposed at an upper front portion of the apparatus body 2, and stores black toner (developer), for example. The drum unit 12 includes a photoconductor drum 14, a charging device 15, a developing device 16, and a transfer roller 17.

The photoconductor drum 14 is formed in a substantially cylindrical shape, and is rotationally driven about a shaft by a motor (not shown). The charging device 15, the developing device 16, and the transfer roller 17 are arranged in an order of an image forming process around the photoconductor drum 14.

The transfer roller 17 is in contact with the photoconductor drum 14 from a lower side and forms a transfer nip. The laser scanning unit 13 is provided above the photoconductor drum 14 and emits scanning light toward a surface of the photoconductor drum 14.

[Image Forming Processing]

Operations of the image forming apparatus 1 will be described. The image forming apparatus 1 is controlled by a control apparatus (not shown), and executes image forming processing as follows based on image data input from an external terminal.

The charging device 15 charges the surface of the photoconductor drum 14. The laser scanning unit 13 emits scanning light that is based on image data, and forms an electrostatic latent image on the photoconductor drum 14. The developing device 16 develops a toner image on the photoconductor drum 14 using toner supplied from the toner container 11.

The sheet feed device 5 feeds the sheets P one by one from the sheet feed cassette 3 to the conveying path 9A. The sheet P is conveyed along the conveying path 9A, subjected to the skew correction by the registration roller pair 10A, and enters the transfer nip.

The transfer roller 17 transfers the toner image on the photoconductor drum 14 onto a surface of the sheet P that passes through the transfer nip. The fixing device 7 thermally fixes the toner image onto the sheet P. When executing one-side printing, the sheet P that has passed through the fixing device 7 is discharged to the sheet discharge tray 4.

When executing double-sided printing, the sheet P that has passed through the fixing device 7 is switched back at a downstream end portion of the conveying path 9A to be conveyed to the inversion conveying path 9B. The conveying roller pairs 10B are arranged on the inversion conveying path 9B.

The sheet P is conveyed by the conveying roller pairs 10B, conveyed back to the conveying path 9A from the inversion conveying path 9B, and conveyed to the transfer nip after being subjected to the skew correction by the registration roller pair 10A. After that, the toner image is transferred and thermally fixed onto the sheet P, and the sheet P that has been subjected to the double-sided printing is discharged to the sheet discharge tray 4.

[Fixing Device]

Figure 2:
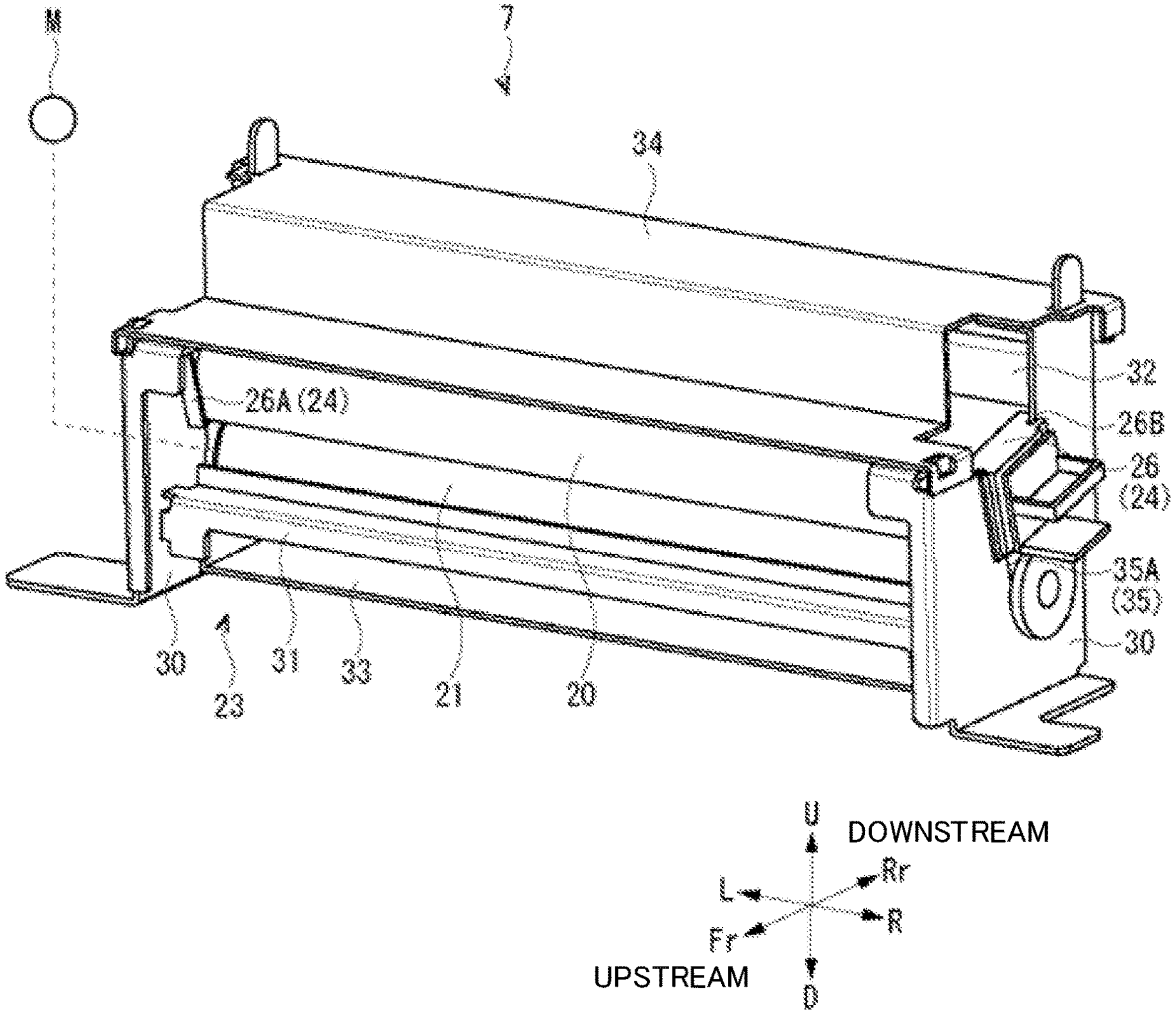
FIG. 2 is a perspective view showing a fixing device according to the embodiment of the present disclosure.
Figure 3:
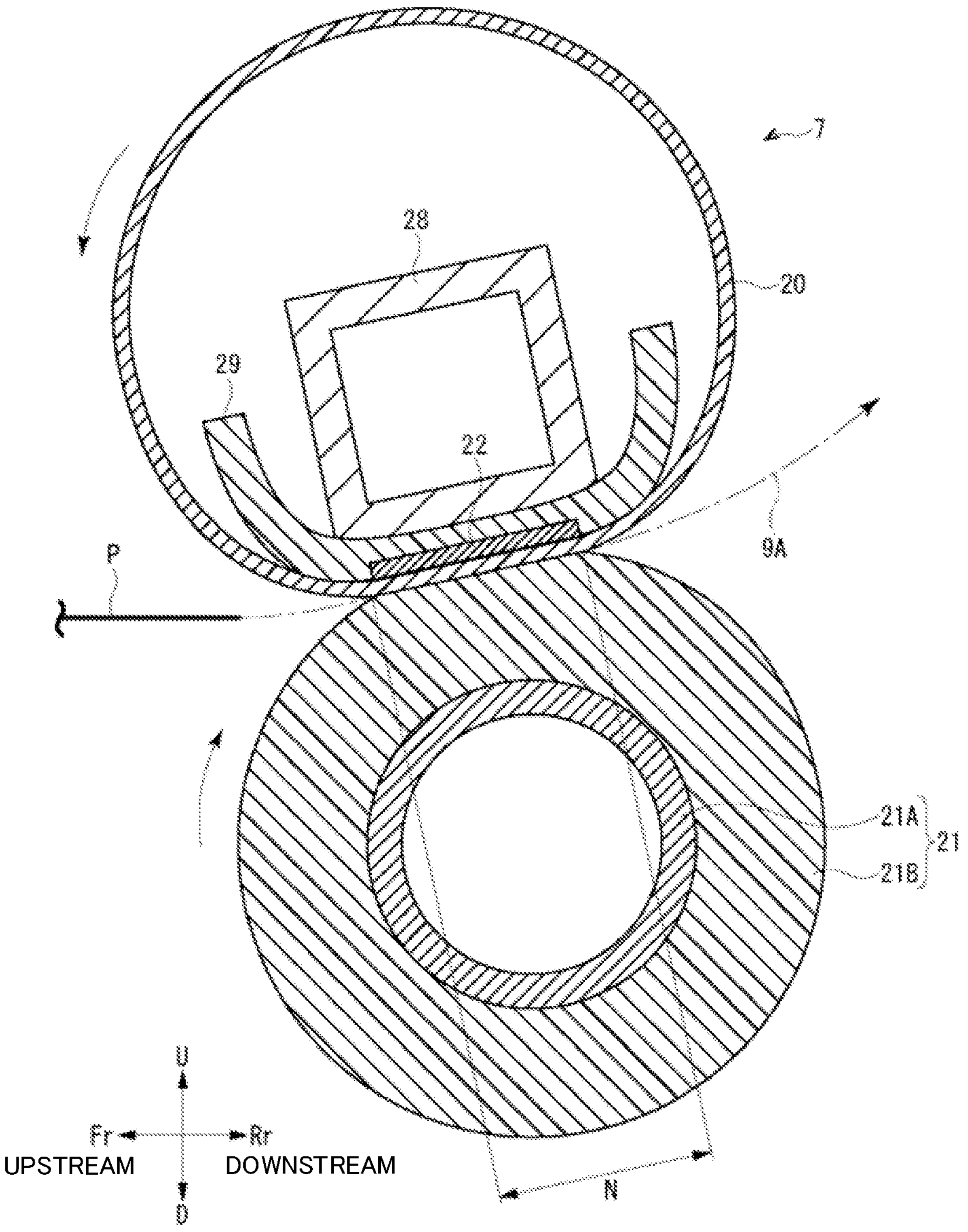
FIG. 3 is a cross-sectional view schematically showing the fixing device according to the embodiment of the present disclosure.

The fixing device 7 will be described with reference to FIG. 2 to FIG. 8. FIG. 2 is a perspective view showing the fixing device 7. FIG. 3 is a cross-sectional view schematically showing the fixing device 7.

Figure 4:
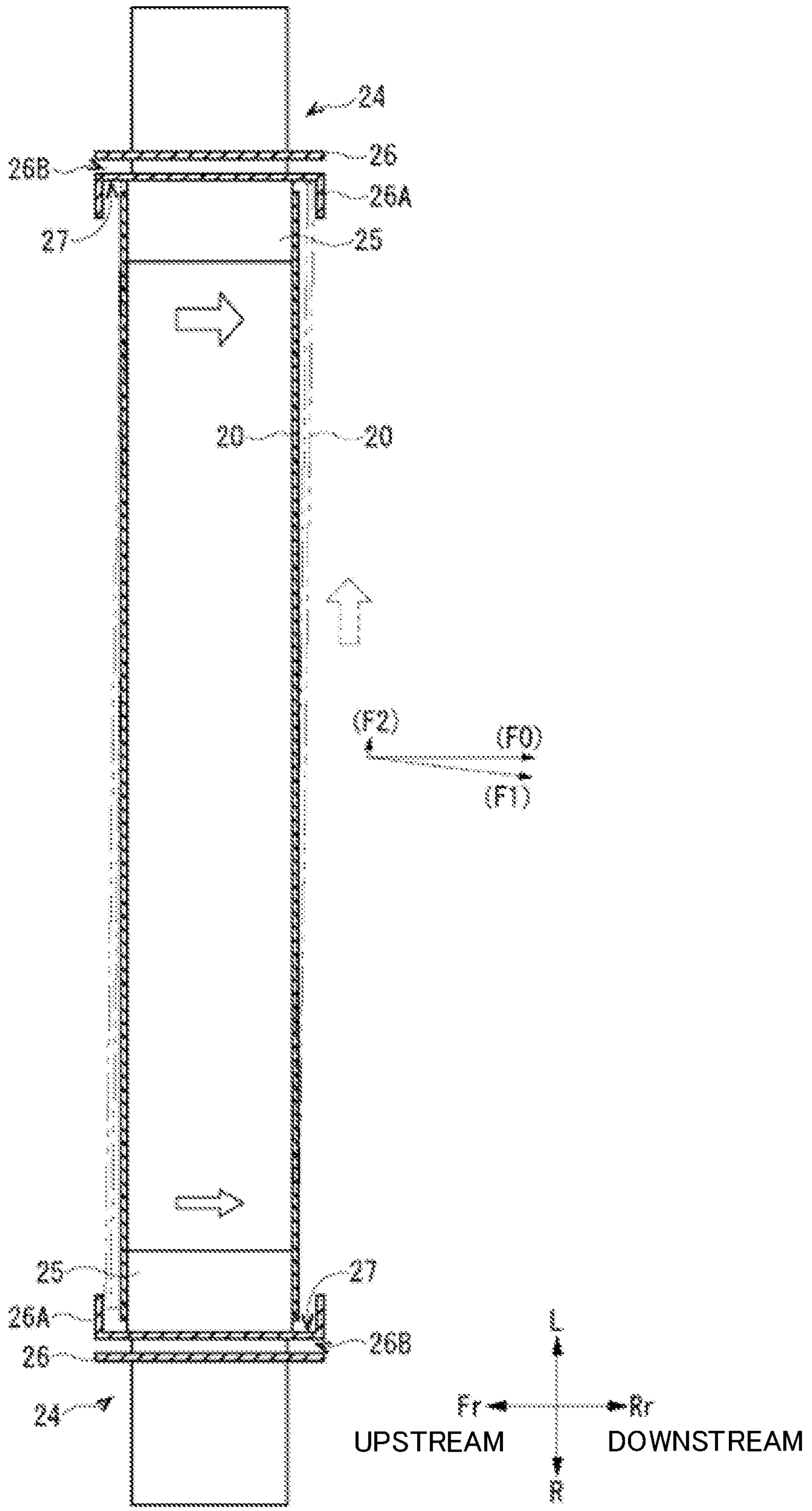
FIG. 4 is a cross-sectional view showing a fixing belt of the fixing device according to the embodiment of the present disclosure.
Figure 5:
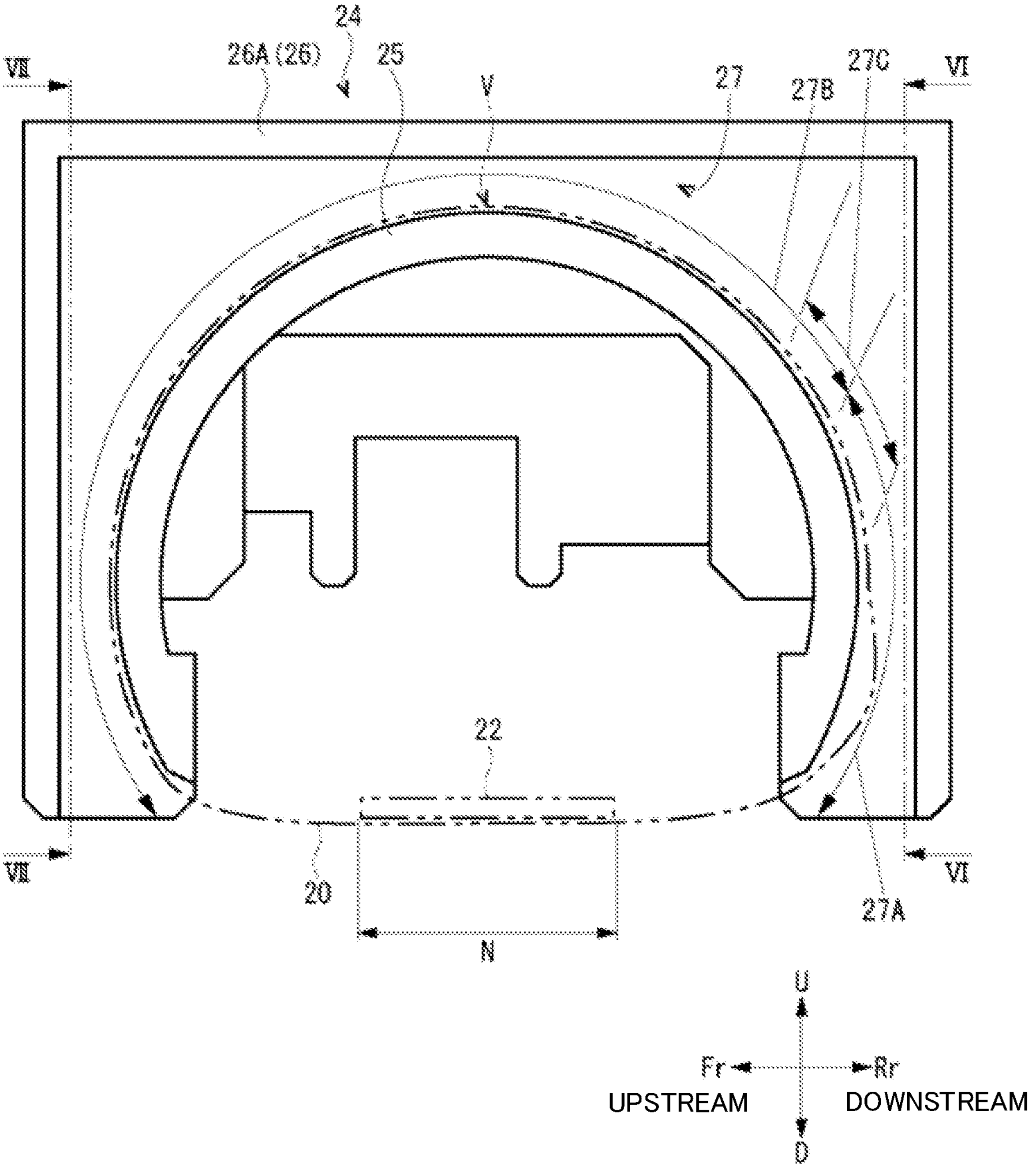
FIG. 5 is a side view showing a retention member of the fixing device according to the embodiment of the present disclosure.

FIG. 4 is a plan view (cross-sectional view) showing a fixing belt 20. FIG. 5 is a side view showing a retention member 24.

Figure 6:
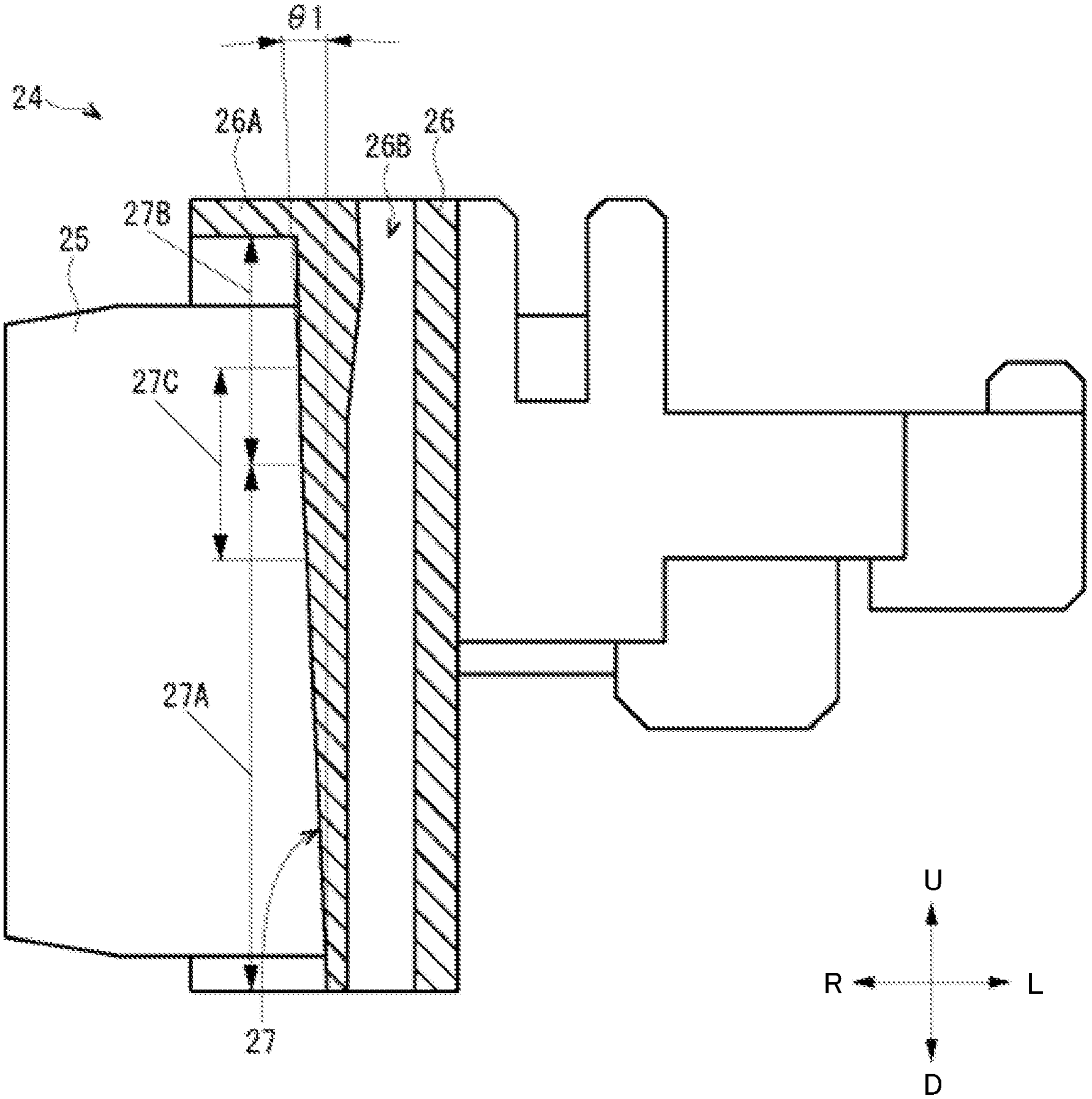
FIG. 6 is a cross-sectional view taken along the line VI-VI of FIG. 5.
Figure 7:
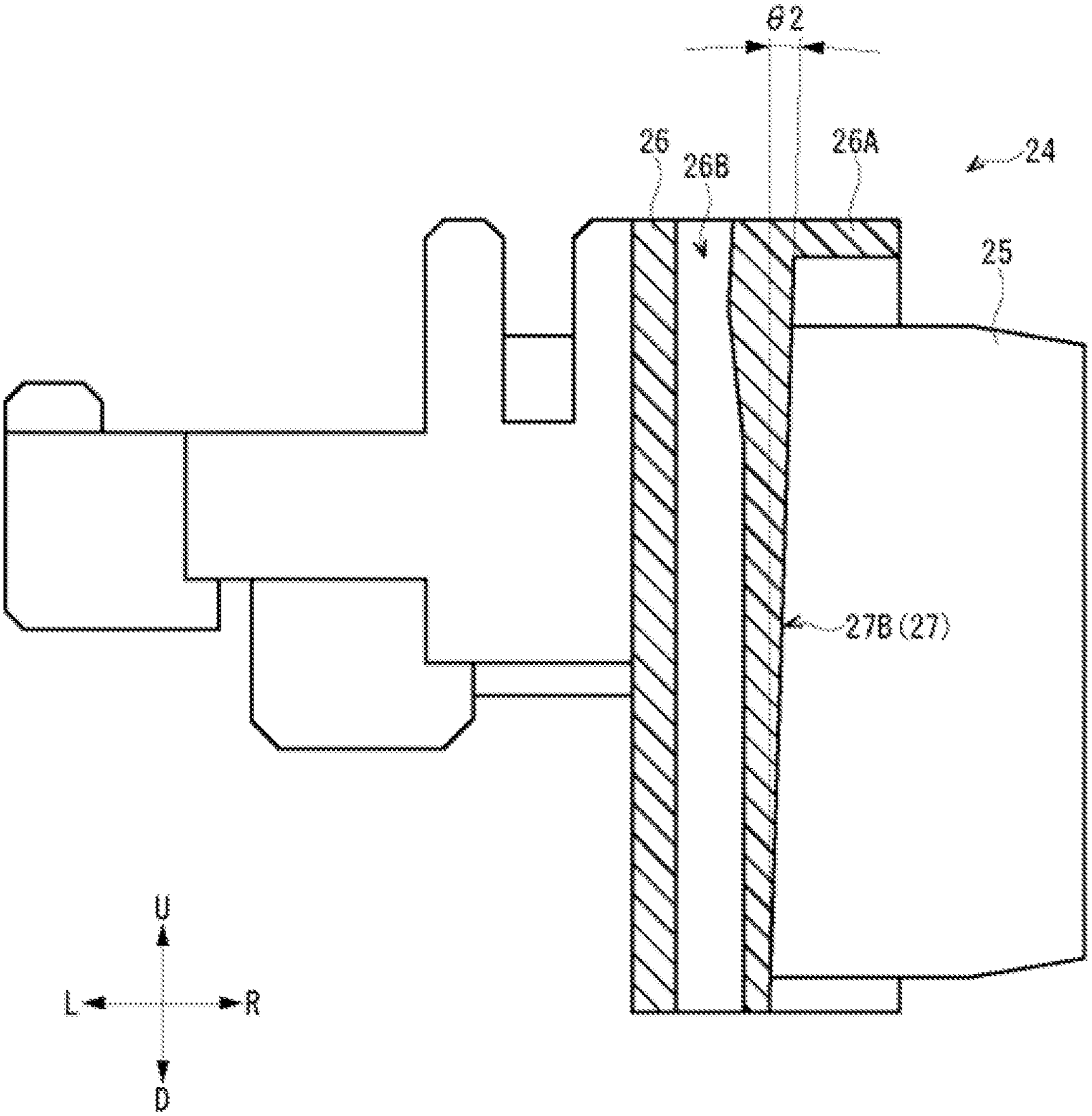
FIG. 7 is a cross-sectional view taken along the line VII-VII of FIG. 5.
Figure 8:
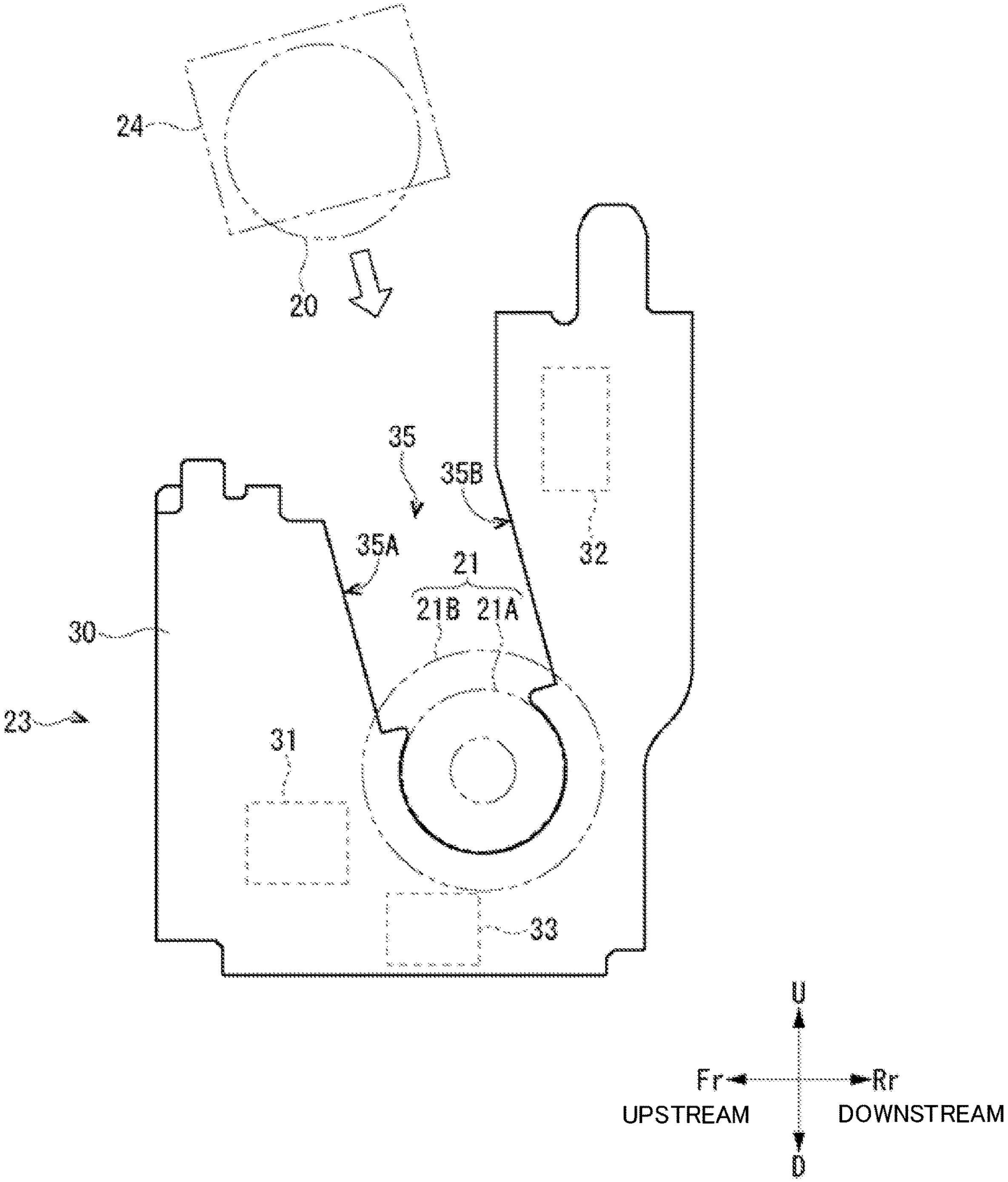
FIG. 8 is a side view showing a side plate and the like of the fixing device according to the embodiment of the present disclosure.

FIG. 6 is a cross-sectional view taken along the line VI-VI of FIG. 5. FIG. 7 is a cross-sectional view taken along the line VII-VII of FIG. 5. FIG. 8 is a side view showing a side plate 30 and the like.

As shown in FIG. 2 and FIG. 3, the fixing device 7 includes the fixing belt 20, a pressure roller 21, a heater 22, and a frame 23.

The fixing belt 20 and the pressure roller 21 are supported by the frame 23, and the frame 23 is fixed to the apparatus body 2. The heater 22 is provided inside the fixing belt 20.

<Fixing Belt>

The fixing belt 20 is an endless belt formed in a substantially cylindrical shape elongated in the left-right direction. The left-right direction is an axial direction of the fixing belt 20. The axial direction is the longitudinal direction of the fixing belt 20. The fixing belt 20 is an example of a tube-like fixing member that extends in the axial direction. The fixing belt 20 is formed of, for example, a synthetic resin or the like having heat resistance and flexibility (elasticity).

(Retention Member)

As shown in FIG. 4, at both end portions of the fixing belt 20 in the left-right direction, a pair of retention members 24 are attached. Each of the retention members 24 includes a shaft-supporting portion 25 and a flange portion 26 which are integrally formed by a synthetic resin having heat resistance and abrasion resistance, for example.

It is noted that since the pair of retention members 24 generally have a bilaterally symmetric shape, one retention member 24 will mainly be described in descriptions below.

As shown in FIG. 5, the shaft-supporting portion 25 has a substantially C-shaped cross-sectional shape that is opened downwardly.

The shaft-supporting portion 25 is inserted inside from both ends of the fixing belt 20. The shaft-supporting portion 25 retains a portion excluding a bottom portion of the fixing belt 20 in a substantially arc shape (also see FIG. 4). The bottom portion of the fixing belt 20 forms a pressure area N. The pressure area N is positioned below the shaft-supporting portion 25. Moreover, the shaft-supporting portions 25 rotatably guide the both end portions of the fixing belt 20 in the axial direction about a shaft. The rotation about the shaft is a rotation about the axial direction.

As shown in FIG. 5 to FIG. 7, the flange portion 26 is formed to extend in a radial direction from an outer end portion of the shaft-supporting portion 25 in the axial direction. At an outer edge portion of the flange portion 26 excluding a lower edge, an insulation wall 26A is formed to extend toward an inner side of the axial direction (also see FIG. 4).

The insulation wall 26A is formed in a substantially rectangular cylindrical shape that is opened downwardly. The insulation wall 26A is provided so that a creepage distance from a substrate or the like disposed in the vicinity of the retention member 24 to the fixing belt 20 becomes sufficient. On both end surfaces of the flange portion 26 in the front-rear direction, insertion grooves 26B extending in the up-down direction are respectively provided (also see FIG. 4).

Further, an inner end surface of the flange portion 26 in the axial direction includes a restriction surface 27 opposing the end portion of the fixing belt 20 in the axial direction. Although details will be described later, the restriction surface 27 is brought into contact with the end portion of the fixing belt 20 in the axial direction to restrict a movement of the fixing belt 20 in the axial direction.

Furthermore, a surface roughness of the shaft-supporting portion 25 is rougher than a surface roughness of the restriction surface 27. In other words, a frictional force between the surface of the shaft-supporting portion 25 and the inner circumferential surface of the fixing belt 20 is larger than a frictional force between the restriction surface 27 and the end portion of the fixing belt 20.

That is, the restriction surface 27 is formed as a smooth surface with small asperities so as to enable the end portion of the fixing belt 20 to rotate while being in contact therewith.

As shown in FIG. 3, a supporting member 28 is provided inside the fixing belt 20. The supporting member 28 is formed of, for example, a metal material such as stainless steel. The supporting member 28 is formed in a substantially rectangular cylindrical shape elongated in the left-right direction.

The supporting member 28 is bridged between the shaft-supporting portions 25 of the pair of retention members 24. In addition, a heater holder 29 is fixed at a lower portion of the supporting member 28.

The heater holder 29 is formed of, for example, a synthetic resin having heat resistance and abrasion resistance. The heater holder 29 is formed in a substantially semicylindrical shape elongated in the left-right direction. The heater holder 29 is in contact with the inner circumferential surface of the fixing belt 20 on the lower side. The lower side of the fixing belt 20 is a side that opposes the pressure roller 21.

<Pressure Roller>

As shown in FIG. 2 and FIG. 3, the pressure roller 21 is formed in a substantially cylindrical shape elongated in the left-right direction. The pressure roller 21 is an example of a pressure member. The pressure roller 21 includes a core metal 21A formed of metal and an elastic layer 21B constituted of a silicon sponge or the like. The elastic layer 21B is laminated on an outer circumferential surface of the core metal 21A.

A driving motor M is connected to a left end portion of the core metal 21A via a gear train (not shown). The pressure roller 21 comes into contact with the fixing belt 20 from the lower side, and forms the pressure area N between the pressure roller 21 and the fixing belt 20.

It is noted that the pressure area N refers to an area where a pressure acts from the pressure roller 21 to the fixing belt 20.

<Heater>

As shown in FIG. 3, the heater 22 is formed in a substantially rectangular plate-like shape elongated in the left-right direction, and is fixed to a lower surface of the heater holder 29. The heater 22 includes a substrate and a heating resistor laminated on the substrate. The heating resistor generates heat by being energized.

The heating resistor of the heater 22 is in contact with the inner circumferential surface of the fixing belt 20 at a position corresponding to the pressure area N.

<Frame>

The frame 23 is formed of, for example, a metal material such as steel and stainless steel.

As shown in FIG. 2, the frame 23 is a box-like structure including a pair of side plates 30, first to third stays 31 to 33, and a connection plate 34. It is noted that since the pair of side plates 30 are generally bilaterally symmetric, one of the side plates 30 will mainly be described in descriptions below.

(Side Plates)

For example, the pair of side plates 30 are formed by a sheet metal bending process, and are formed substantially in an erected plate-like shape. The pair of side plates 30 are arranged opposed to each other in the left-right direction on both sides of the fixing belt 20.

As shown in FIG. 8, the side plate 30 includes a fitting groove 35 cut in from one end portion toward the other end portion in the up-down direction. In the example shown in FIG. 8, the fitting groove 35 is cut in downwardly from an upper end of the side plate 30.

The fitting groove 35 is formed between both ends of the side plate 30 in the front-rear direction. A portion of the side plate 30 on a rear side of the fitting groove 35 is formed to be higher than a portion of the side plate 30 on a front side of the fitting groove 35.

The core metal 21A of the pressure roller 21 and the retention member 24 of the fixing belt 20 are fit into the fitting groove 35 (see FIG. 2 and FIG. 8).

Side edge portions 35A and 35B of the fitting groove 35 are inserted into the insertion grooves 26B of the retention member 24 (see FIG. 6 and FIG. 7). The fixing belt 20 is supported by the pair of side plates 30 via the pair of retention members 24 (see FIG. 2).

It is noted that each of the retention members 24 is pressed downwardly by an elastic member (not shown) such as a compression spring. Thus, the fixing belt 20 is retained in a state where it is in contact with the pressure roller 21.

(First to Third Stays)

The first to third stays 31 to 33 are formed by a sheet metal bending process, for example.

As shown in FIG. 2 and FIG. 8, the first to third stays 31 to 33 connect the pair of side plates 30 and retain a gap between the pair of side plates 30 constant. The first to third stays 31 to 33 are bridged between the pair of side plates 30. The second stay 32 is disposed on a rear side of the first stay 31, and the third stay 33 is disposed between the first stay 31 and the second stay 32 in the front-rear direction.

It is noted that both end portions of the first to third stays 31 to 33 in the left-right direction are respectively fixed to the pair of side plates 30 by screws (not shown).

(Connection Plate)

As shown in FIG. 2, the connection plate 34 is formed in, for example, a crank shape including a pair of horizontal plate portions having different heights and a perpendicular plate portion connecting the pair of horizontal plate portions. The connection plate 34 is formed by, for example, a sheet metal bending process. The connection plate 34 is bridged between one end portions of the pair of side plates 30 in the up-down direction. For example, the connection plate 34 is bridged between upper end portions of the pair of side plates 30.

It is noted that the frame 23 is provided with a temperature sensor (not shown) for detecting a surface temperature of the fixing belt 20. For example, the temperature sensor is provided in the second stay 32. The driving motor M, the heater 22, the temperature sensor, and the like are electrically connected to the control apparatus of the image forming apparatus 1 via various driving circuits (not shown) to be controlled as appropriate by the control apparatus.

[Action of Fixing Device]

Herein, fixing processing of the fixing device 7 will be described. The pressure roller 21 rotates upon receiving a driving force of the driving motor M, and the fixing belt 20 rotates by being driven by the pressure roller 21 (see the arrows of FIG. 3).

The heater 22 heats the fixing belt 20. The control apparatus receives a detection signal from the temperature sensor. The control apparatus causes the image forming apparatus 1 to execute the image forming processing while controlling the heater 22 such that a detected temperature maintains a preset temperature.

The sheet P onto which the toner image has been transferred enters the frame 23. The fixing belt 20 heats, while rotating, toner on the sheet P that passes through the pressure area N.

As the pressure roller 21 pressurizes, while rotating, the toner on the sheet P that passes through the pressure area N, the toner image is fixed onto the sheet P. Then, the sheet P onto which the toner image has been fixed is conveyed outside the frame 23 to be discharged to the sheet discharge tray 4.

[Leaning Force and Damage of Fixing Belt]

Incidentally, when the fixing belt 20 rotates upon receiving a uniform force in the left-right direction, a force of moving the fixing belt 20 in the left-right direction is not generated. Hereinafter, a force of moving the fixing belt 20 in the left-right direction will be referred to as a leaning force. When the leaning force is not generated, both ends of the fixing belt 20 in the left-right direction do not come into contact with the restriction surfaces 27 of the pair of retention members 24 (see the solid lines of FIG. 4).

However, when an outer diameter of the pressure roller 21 is not uniform or a bias force of a pair of elastic members that bias the pair of retention members 24 is not uniform, a difference in rotation speed of the fixing belt 20 is caused between the left side and the right side. In this case, a difference in conveying force is caused between the left side and the right side, and thus a leaning force acts on the fixing belt 20.

For example, the rotation speed on the left side may be higher than that on the right side (see the open arrows in solid lines in FIG. 4). In this case, the fixing belt 20 is in an attitude in which the left side thereof is tilted more toward the downstream side than the right side thereof (see the chain double-dashed lines of FIG. 4). Therefore, the left-side inner circumferential surface of the fixing belt 20 is guided by a portion of the shaft-supporting portion 25 on the upstream side, and the right-side inner circumferential surface of the fixing belt 20 is guided by a portion of the shaft-supporting portion 25 on the downstream side.

If a rotation direction F1 of the fixing belt 20 tilts with respect to a passing direction F0 of the sheet P, a component force F2 to move the fixing belt 20 toward a side having a higher rotation speed acts on the fixing belt 20. This component force F2 is the leaning force that moves the fixing belt 20 in the left-right direction (see the open arrow in the chain double-dashed line in FIG. 4).

In the example shown in FIG. 4, by the left end portion of the fixing belt 20 coming into contact with the restriction surface 27 of the retention member 24, the leftward movement of the fixing belt 20 is restricted (see the chain double-dashed lines of FIG. 4). At this time, as indicated by the chain double-dashed line of FIG. 5, the left-side inner circumferential surface of the fixing belt 20 is guided by the portion of the shaft-supporting portion 25 on the upstream side, and is set apart from the portion of the shaft-supporting portion 25 on the downstream side.

On the other hand, the right-side inner circumferential surface of the fixing belt 20 is guided by the portion of the shaft-supporting portion 25 on the downstream side, and is set apart from the portion of the shaft-supporting portion 25 on the upstream side. This state is a state where the fixing belt 20 indicated by the chain double-dashed line in FIG. 5 is inverted bilaterally, so illustrations thereof will be omitted.

When the end portion of the fixing belt 20 comes into contact with the restriction surface 27 in the state where the inner circumferential surface of the fixing belt 20 is apart from the shaft-supporting portion 25, the end portion of the fixing belt 20 may be bent or the like to be damaged.

[Details of Restriction Surface]

In this regard, in the fixing device 7 according to the present embodiment, the restriction surface 27 of the retention member 24 is formed in a shape with which it is difficult for the restriction surface 27 to come into contact with the end portion of the fixing belt 20 set apart from the surface of the shaft-supporting portion 25. Hereinafter, the restriction surface 27 of the retention member 24 will be described in detail with reference to FIG. 5 to FIG. 7.

As shown in FIG. 5, the restriction surface 27 of the retention member 24 includes a first contact area 27A and a second contact area 27B when seen from the axial direction of the fixing belt 20 (see the ranges indicated by the arrows in FIG. 5).

<First Contact Area 27A>

As shown in FIG. 5, the first contact area 27A is an area more on the downstream side than a center of the pressure area N in the passing direction of the sheet P, and also closer to the pressure area N than an apex V of the fixing belt 20.

It is noted that the apex V of the fixing belt 20 is positioned on an opposite side of the pressure area N in a radial direction of the fixing belt 20. The apex V of the fixing belt 20 may also be referred to as an apex V of the shaft-supporting portion 25. In the present embodiment, the first contact area 27A is positioned on a lower side of the apex V.

For example, the first contact area 27A continuously extends from a lower end of the restriction surface 27 to a vicinity of an upper corner of the restriction surface 27 on the downstream side with respect to the pressure area N.

In other words, the first contact area 27A is a substantially I-shaped flat surface formed along the insulation wall 26A extending in the up-down direction on the downstream side with respect to the pressure area N. That is, the first contact area 27A is a range in which the fixing belt 20 may be set apart from the shaft-supporting portion 25 on the downstream side with respect to the pressure area N.

<Second Contact Area 27B>

As shown in FIG. 5, the second contact area 27B is an area of the restriction surface 27 excluding the first contact area 27A. For example, the second contact area 27B continuously extends from the vicinity of the upper corner of the restriction surface 27 on the downstream side with respect to the pressure area N to a lower end of the restriction surface 27 on the upstream side with respect to the pressure area N via an upper corner on the upstream side with respect to the pressure area N.

In other words, the second contact area 27B is a substantially inverted L-shaped flat surface formed along a portion of the insulation wall 26A extending in the front-rear direction above the shaft-supporting portion 25 and a portion extending in the up-down direction on the upstream side with respect to the pressure area N. That is, the second contact area 27B is a range in which the fixing belt 20 is guided by the shaft-supporting portion 25 without being set apart from the shaft-supporting portion 25.

<Tilt of First and Second Contact Areas>

As shown in FIG. 6 and FIG. 7, the first contact area 27A and the second contact area 27B are each tilted at a certain gradient so as to be set apart from the end portion of the fixing belt 20 in the axial direction from the side of the apex V toward the side of the pressure area N.

In other words, the first and second contact areas 27A and 27B are flat surfaces that do not have steps and gradually tilt toward an outer side of the axial direction with respect to a perpendicular surface.

For example, a tilt angle θ1 of the first contact area 27A is about 1.5 degrees, and a tilt angle θ2 of the second contact area 27B is about 1 degree (see FIG. 6 and FIG. 7). In other words, θ1 is larger than θ2. It is noted that the first and second contact areas 27A and 27B are not tilted in the passing direction of the sheet P.

In general, as the tilt angles θ1 and θ2 increase, it becomes more difficult for the first and second contact areas 27A and 27B to come into contact with the end portion of the fixing belt 20 when the leaning force acts on the fixing belt 20.

However, if the tilt angles (θ1 and θ2) of the first and second contact areas 27A and 27B are set to be large, a contact area between the first and second contact areas 27A and 27B and the end portion of the fixing belt 20 is reduced, and the leaning force is received by the reduced contact area, so buckling of the fixing belt 20 is apt to occur.

Therefore, it is preferable for the first and second contact areas 27A and 27B to come into contact with the end portion of the fixing belt 20 in a range in which the inner circumferential surface of the fixing belt 20 is guided by the shaft-supporting portion 25, and to evacuate from the end portion of the fixing belt 20 in a range in which the inner circumferential surface of the fixing belt 20 is not guided by the shaft-supporting portion 25 (in a range in which the inner circumferential surface is apart from the surface of the shaft-supporting portion 25).

With the tilt angles θ1 and θ2 of about 1 degrees, the following test result has been confirmed. In the test result, in an area where the inner circumferential surface of the fixing belt 20 is guided by the shaft-supporting portion 25, the first and second contact areas 27A and 27B are in contact with the end portion of the fixing belt 20. In addition, in the test result, in an area where the inner circumferential surface of the fixing belt 20 is not guided by the shaft-supporting portion 25, the first and second contact areas 27A and 27B are not in contact with the end portion of the fixing belt 20 or are in contact with the end portion of the fixing belt 20 with a contact pressure of a level at which buckling of the fixing belt 20 does not occur. It is noted that the area where the inner circumferential surface of the fixing belt 20 is not guided by the shaft-supporting portion 25 is an area of the lower portions of the shaft-supporting portion 25 on the upstream side and downstream side with respect to the pressure area N.

In the fixing device 7 according to the present embodiment described above, the second contact area 27B excluding the first contact area 27A on the downstream side is continuously tilted toward the outer side of the axial direction from the side of the apex V toward the side of the pressure area N.

With this configuration, the first contact area 27A constitutes a tilted flat surface having no angular portion. Therefore, the end portion of the fixing belt 20 is prevented from being brought into contact with only the first contact area 27A. Thus, a damage of the end portion of the fixing belt 20 in the axial direction can be suppressed.

<Boundary Portion Between First and Second Contact Areas>

As shown in FIG. 5 and FIG. 6, a boundary portion between the first contact area 27A and the second contact area 27B is a curved surface 27C.

It is noted that the boundary portion is a portion that has a certain width and includes a boundary between the first contact area 27A and the second contact area 27B.

With this configuration, the first and second contact areas 27A and 27B continue smoothly via the curved surface 27C. Therefore, while suppressing the damage of the end portion of the fixing belt 20, the restriction surface 27 can surely catch the fixing belt 20 that tries to move in the axial direction.

Moreover, in the fixing device 7 according to the present embodiment, the surface of the shaft-supporting portion 25 is rougher than that of the restriction surface 27. Therefore, the end portion of the fixing belt 20 smoothly slides on the restriction surface 27 while being supported by the shaft-supporting portion 25.

Figure 9:
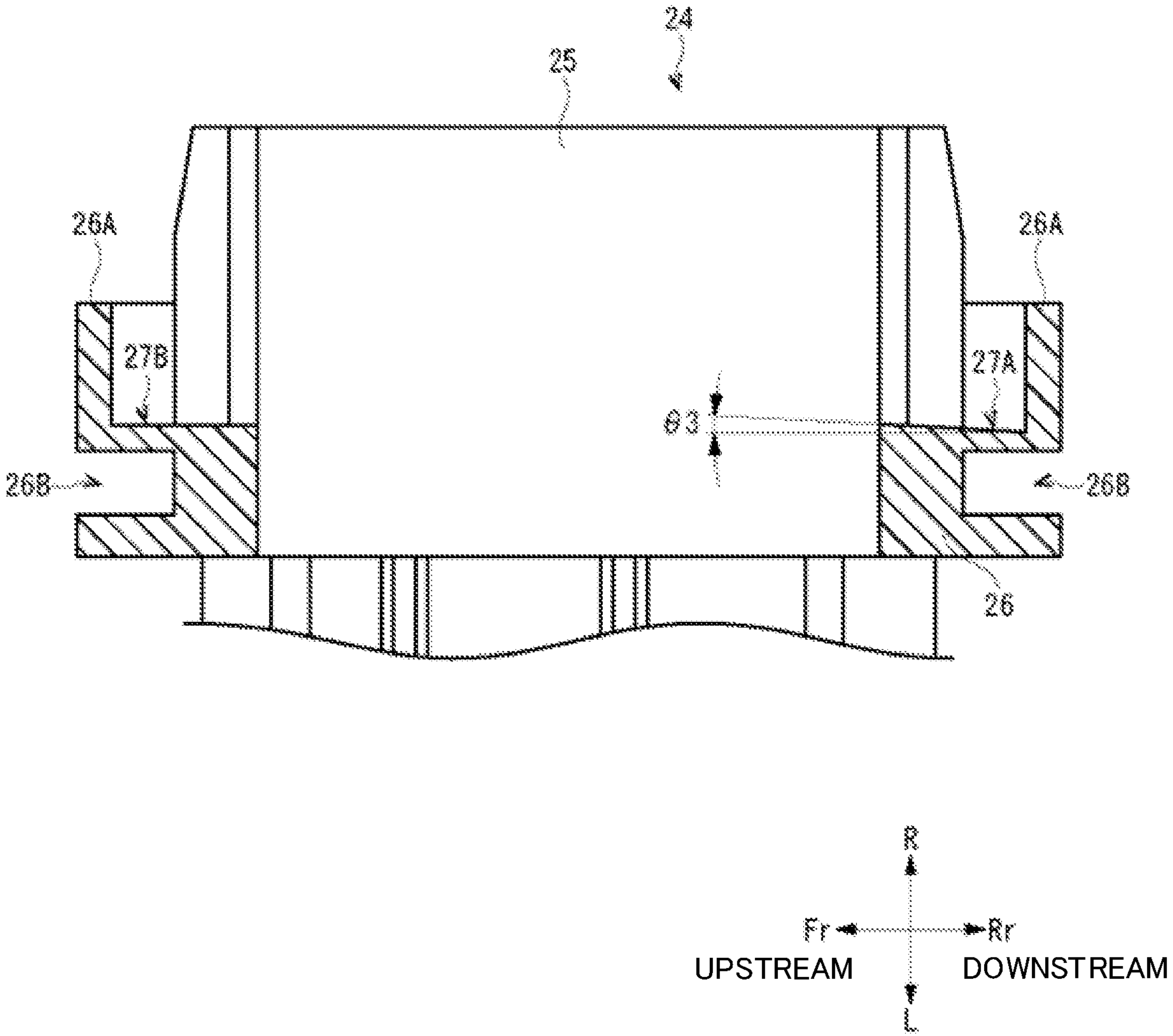
FIG. 9 is a bottom view (cross-sectional view) of the retention member of the fixing device according to a modified example of the embodiment of the present disclosure.

It is noted that in the fixing device 7 according to the present embodiment, the first contact area 27A is tilted toward the outer side of the axial direction downwardly from above. In addition to this tilt, the first contact area 27A may be tilted at a certain gradient so as to be set apart from the end portion of the fixing belt 20 in the axial direction from the upstream side toward the downstream side (see the modified example shown in FIG. 9).

A tilt angle θ3 of the first contact area 27A in the passing direction is about 1 to 2 degrees. With this configuration, since the first contact area 27A is tilted so as to spread downwardly also toward the downstream side, it becomes more difficult for the end portion of the fixing belt 20 to come into contact with the first contact area 27A.

It is noted that in the fixing device 7 according to the present embodiment including the modified example, the first contact area 27A is tilted at a tilt angle larger than that of the second contact area 27B (θ1>θ2). However, the present disclosure is not limited to this. The first contact area 27A and the second contact area 27B may be tilted at the same tilt angle (θ1=θ2).

Further, in the fixing device 7 according to the present embodiment, since the surface of the shaft-supporting portion 25 is rougher than that of the restriction surface 27, a frictional force between the surface of the shaft-supporting portion 25 and the inner circumferential surface of the fixing belt 20 is high. However, the present disclosure is not limited to this.

For example, a sheet having a higher friction coefficient than the restriction surface 27 may be attached to a part or all of the surface of the shaft-supporting portion 25. Thus, the surface of the shaft-supporting portion 25 is given a higher friction coefficient than the restriction surface 27. Moreover, the shaft-supporting portion 25 and the restriction surface 27 of the flange portion 26 may respectively be formed of materials having different friction coefficients.

In addition, in the fixing device 7 according to the present embodiment, the boundary portion between the first contact area 27A and the second contact area 27B is the curved surface 27C. However, the present disclosure is not limited to this. For example, the boundary portion may be a substantially perpendicular surface instead of the curved surface 27C (not shown).

Further, in the fixing device 7 according to the present embodiment, the fitting groove 35 is cut in downwardly from the upper end of the side plate 30. However, the present disclosure is not limited to this. For example, the fitting groove 35 may be cut in upwardly from the lower end of the side plate 30 (not shown).

Furthermore, although the fixing belt 20 and the pressure roller 21 are supported by the fitting grooves 35, the present disclosure is not limited to this. For example, the pressure roller 21 may be rotatably supported by the side plates 30 at positions different from the fitting grooves 35 (not shown).

Moreover, in the descriptions of the embodiment above, the case where the present disclosure is applied to a monochromatic image forming apparatus 1 has been described as an example. However, the present disclosure is not limited to this. For example, the present disclosure may be applied to a color printer, a copying machine, a facsimile, a multifunction peripheral, and the like.

It is noted that the descriptions of the embodiment above merely describe an aspect of the fixing device and the image forming apparatus according to the present disclosure, and the technical scope of the present disclosure is not limited to the embodiment above. The present disclosure may be variously changed, substituted, or modified without departing from the gist of the technical idea of the present disclosure, and the scope of claims includes all embodiments that may fall within the scope of the technical idea.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A fixing device, comprising:

a fixing member which has flexibility, is formed in a cylindrical shape extending in an axial direction, and heats a toner image on a medium while rotating;

a pressure member which forms a pressure area between the pressure member and the fixing member while rotating, and pressurizes toner on the medium that passes through the pressure area; and a pair of retention members each including a shaft-supporting portion which rotatably guides one of both end portions of the fixing member in the axial direction, and a restriction surface which opposes the end portion of the fixing member in the axial direction and restricts a movement of the fixing member in the axial direction, wherein the restriction surface includes:

a first contact area which is an area more on a downstream side of a passing direction of the medium than a center of the pressure area in the passing direction, and also closer to the pressure area than an apex of the fixing member positioned on an opposite side of the pressure area in a radial direction of the fixing member, and a second contact area which is an area of the restriction surface excluding the first contact area, the first contact area and the second contact area are each tilted at a certain gradient so as to be set apart from the end portion of the fixing member in the axial direction from a side of the apex toward a side of the pressure area, and a surface of the shaft-supporting portion has a larger friction coefficient than the restriction surface.

2. The fixing device according to claim 1, wherein the first contact area is tilted at a certain gradient so as to be set apart from the end portion of the fixing member in the axial direction from an upstream side of the passing direction toward the downstream side.

3. The fixing device according to claim 1, wherein a boundary portion between the first contact area and the second contact area is a curved surface.

4. An image forming apparatus, comprising:

an imaging device which forms a toner image on a medium; and the fixing device according to claim 1.

5. A fixing device, comprising:

a fixing member which has flexibility, is formed in a cylindrical shape extending in an axial direction, and heats a toner image on a medium while rotating;

a pressure member which forms a pressure area between the pressure member and the fixing member while rotating, and pressurizes toner on the medium that passes through the pressure area; and a pair of retention members each including a shaft-supporting portion which rotatably guides one of both end portions of the fixing member in the axial direction, and a restriction surface which opposes the end portion of the fixing member in the axial direction and restricts a movement of the fixing member in the axial direction, wherein the restriction surface includes:

a first contact area which is an area more on a downstream side of a passing direction of the medium than a center of the pressure area in the passing direction, and also closer to the pressure area than an apex of the fixing member positioned on an opposite side of the pressure area in a radial direction of the fixing member, and a second contact area which is an area of the restriction surface excluding the first contact area, the first contact area and the second contact area are each tilted at a certain gradient so as to be set apart from the end portion of the fixing member in the axial direction from a side of the apex toward a side of the pressure area, and a surface roughness of the shaft-supporting portion is rougher than a surface roughness of the restriction surface.

6. The fixing device according to claim 5, wherein the first contact area is tilted at a certain gradient so as to be set apart from the end portion of the fixing member in the axial direction from an upstream side of the passing direction toward the downstream side.

7. The fixing device according to claim 5, wherein a boundary portion between the first contact area and the second contact area is a curved surface.

8. An image forming apparatus, comprising:

an imaging device which forms a toner image on a medium; and the fixing device according to claim 5.

* * * * *